(12) United States Patent
Nagasawa et al.

(10) Patent No.: US 6,633,394 B2
(45) Date of Patent: *Oct. 14, 2003

(54) IMAGE OUTPUT DEVICE AND IMAGE OUTPUT METHOD

(75) Inventors: Kenichi Nagasawa, Ibaraki (JP); Toshikazu Kawaguchi, Kobe (JP); Tadashi Ohira, Itami (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,717

(22) Filed: Oct. 16, 1998

(65) Prior Publication Data

US 2003/0025928 A1 Feb. 6, 2003

(30) Foreign Application Priority Data

Oct. 17, 1997 (JP) ............................................. 9-284807

(51) Int. Cl.[7] .............................................. G06K 15/00
(52) U.S. Cl. ....................................... 358/1.14; 358/437
(58) Field of Search ................. 358/1.1–1.9, 1.11–1.18, 358/437, 468; 399/14, 15, 16, 17, 18, 19, 20, 21, 76, 77, 80, 81; 355/110

(56) References Cited

U.S. PATENT DOCUMENTS

| | | | | |
|---|---|---|---|---|
| 5,070,467 A | * | 12/1991 | Todome ...................... 345/502 |
| 5,377,016 A | * | 12/1994 | Kashiwagi et al. ......... 358/403 |
| 5,550,614 A | * | 8/1996 | Motoyama .................. 355/206 |
| 5,748,337 A | * | 5/1998 | Minamizawa ............... 358/468 |
| 5,778,163 A | * | 7/1998 | Terajima .................... 358/1.14 |
| 5,790,279 A | * | 8/1998 | Sakellaropoulos .......... 358/498 |
| 5,966,219 A | * | 10/1999 | Mori .......................... 358/442 |

FOREIGN PATENT DOCUMENTS

JP          8-336002          12/1996

* cited by examiner

*Primary Examiner*—Gabriel Garcia
*Assistant Examiner*—King Y. Poon
(74) *Attorney, Agent, or Firm*—Burns, Doane, Swecker & Mathis, LLP

(57) ABSTRACT

An image outputting device and method that includes the steps of receiving image data from a first image data source; outputting the received image data; monitoring the first image data source for a problem; initiating a timer upon detection of a problem in the first image data source; suspending operation of the outputting step upon the detection of the problem in the first image data source; monitoring the passage of time since detection of the problem; and upon the lapse of a predetermined time, outputting image data received from a second image data source. Furthermore, if the problem is solved before the lapse of the predetermined period of time, resuming outputting of the image data received from the first image data source.

14 Claims, 3 Drawing Sheets

IMAGE OUTPUT DEVICE AND IMAGE OUTPUT METHOD

This application is based on Japanese Patent Application No. 9-284807 filed in Japan on Oct. 17, 1997 the content of which is hereby incorporated herein by reference.

BACKGROUND OF THE INVENTION

1. Field of the Invention

The present invention pertains to an image output device and an image output method to print image data sent from multiple image data sources.

2. Description of Related Art

In recent years, digital copying machines have been proposed wherein an image reader that reads the original document and outputs image data and a printer that prints the image data from this image reader are constructed as one unit. Some of these digital copying machines have controllers corresponding to each data source in order to make it possible to print image data from a personal computer or image data sent via facsimile transmission. Digital copying machines that can print image data from multiple data sources will be referred to below as multi-function digital copying machines.

Printing systems that may be used as copying machines have also been commercialized, in which a printer connected to a personal computer is connected to an image reader such that the image data obtained by reading the original document by means of the image reader may be directly transmitted to the printer and printed.

With these multi-function copying machines or printing systems, many original documents may be efficiently handled by the image reader by using an automatic document feeder (ADF), as in the case of regular copying machines.

However, in these conventional devices, when the image of the original document set on the automatic document feeder is read by the image reader and the copy job operation to perform printing starts, printing of image data from other image data sources is prohibited until the first job is completed. During the execution of a copy job operation, however, the process to receive print jobs from other image data sources, i.e., the process to receive data and store it, is performed.

In the conventional devices, when the image reading by the image reader is suspended due to a paper jam in the automatic document feeder or a failure of the original document illuminating lamp, printing of images from other image data sources is not performed. A problem therefore exists that from the viewpoint of other image data sources, the printer is virtually inoperable (unusable) and the jobs are put on hold until the problem in regard to the reading operation is eliminated.

OBJECTS AND SUMMARY

The present invention was created in consideration of this situation. One of its objects is to provide an improved image output device and an improved image output method.

Another object of the present invention is to provide an image output device and an image output method with improved ease of use.

Yet another object of the present invention is to provide an image output method that reduces the need to suspend output operations when a problem has occurred in regard to the reading operation, while maintaining the convenience of reading and outputting the original document.

In order to attain these and other objects, in a preferred embodiment of the present invention, when the original document reading operation is suspended because a problem has occurred in the feeding of the original document in the automatic document feeder or due to a failure of the image reader, the operation mode in which the read image data is output is maintained until a preset time period elapses, and when the preset time period has elapsed, the operation mode is changed to another operation mode in which image data from other image data sources may be output, for example. If the problem is eliminated before the preset time period elapses, the output of the read image is resumed without switching to the other operation mode.

If the operation mode is changed immediately when a problem occurs, even when the problem is minor, such as a paper jam that can be eliminated in a short period of time, printing of images from other image data sources may begin while the user is still working to eliminate the problem. When that happens, sheets of print jobs from other image data sources are ejected onto the eject paper tray and become commingled with the sheets of the copy job for the current original document, which forces the user to sort them. On the other hand, if the operation mode is changed after a preset time period elapses, the user can work to eliminate the problem without rushing and thereafter restart the copy job. In addition, by limiting the time that other image data sources must wait until the preset time period has elapsed (recovery waiting period), the inconvenience that printing of printable print jobs from external devices is not executed may be eliminated.

BRIEF DESCRIPTION OF THE DRAWINGS

These and other objects and features of the present invention will become apparent from the following description of a preferred embodiment thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
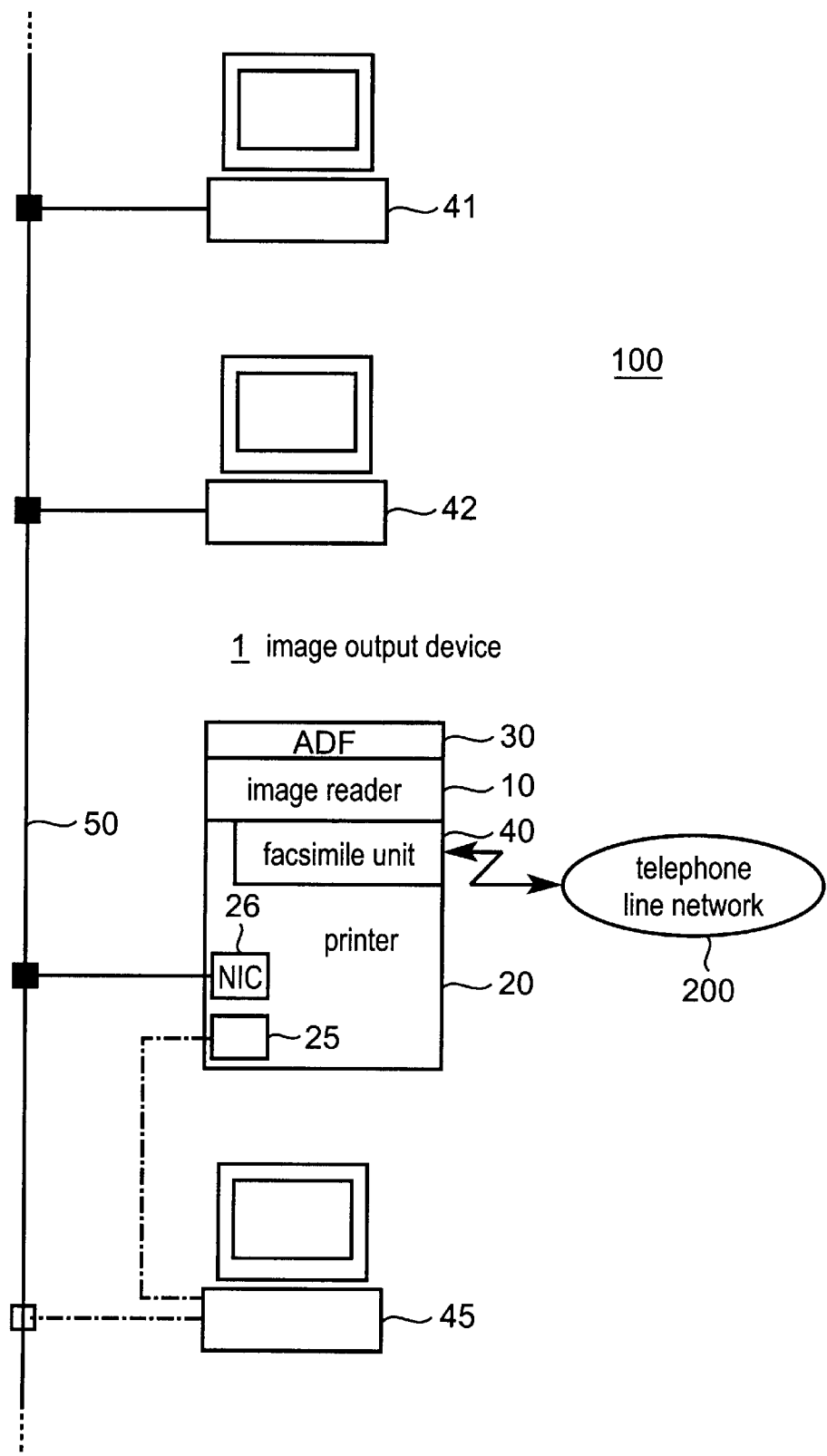
FIG. 1 is a drawing showing the construction of components of a network.

FIG. 1 is a drawing showing the construction of components of a network 100.

The network 100 is a LAN that is constructed such that multiple computers 41 and 42 use an image output device 1. The image output device 1 is a multi-function digital copying machine comprising an image reader 10, a printer 20, an automatic document feeder (ADF) 30 and a facsimile unit 40. The image output device 1, however, is not necessarily configured as one unit that incorporates these components. It may have a system construction in which standalone units are connected via cables.

In the network 100, the image output device 1 and the cable 50 are connected via a network interface card (NIC) 26 included in the printer 20, so that one computer 41 functions as a print server. It is also possible to adopt a network configuration in which the image output device 1 is connected to the computer 45 using a parallel port 25 of the printer 20 and the printer 20 is connected to the cable 50 via the computer 45.

The image reader 10 may be a flat bed type that sequentially scans on a line by line basis the image of the original document positioned on the platen glass. The automatic document feeder 30 also functions as an original document cover, and is mounted to the image reader 10 such that it may open and close. The facsimile unit 40 is connected to a telephone line network 200.

Figure 2:
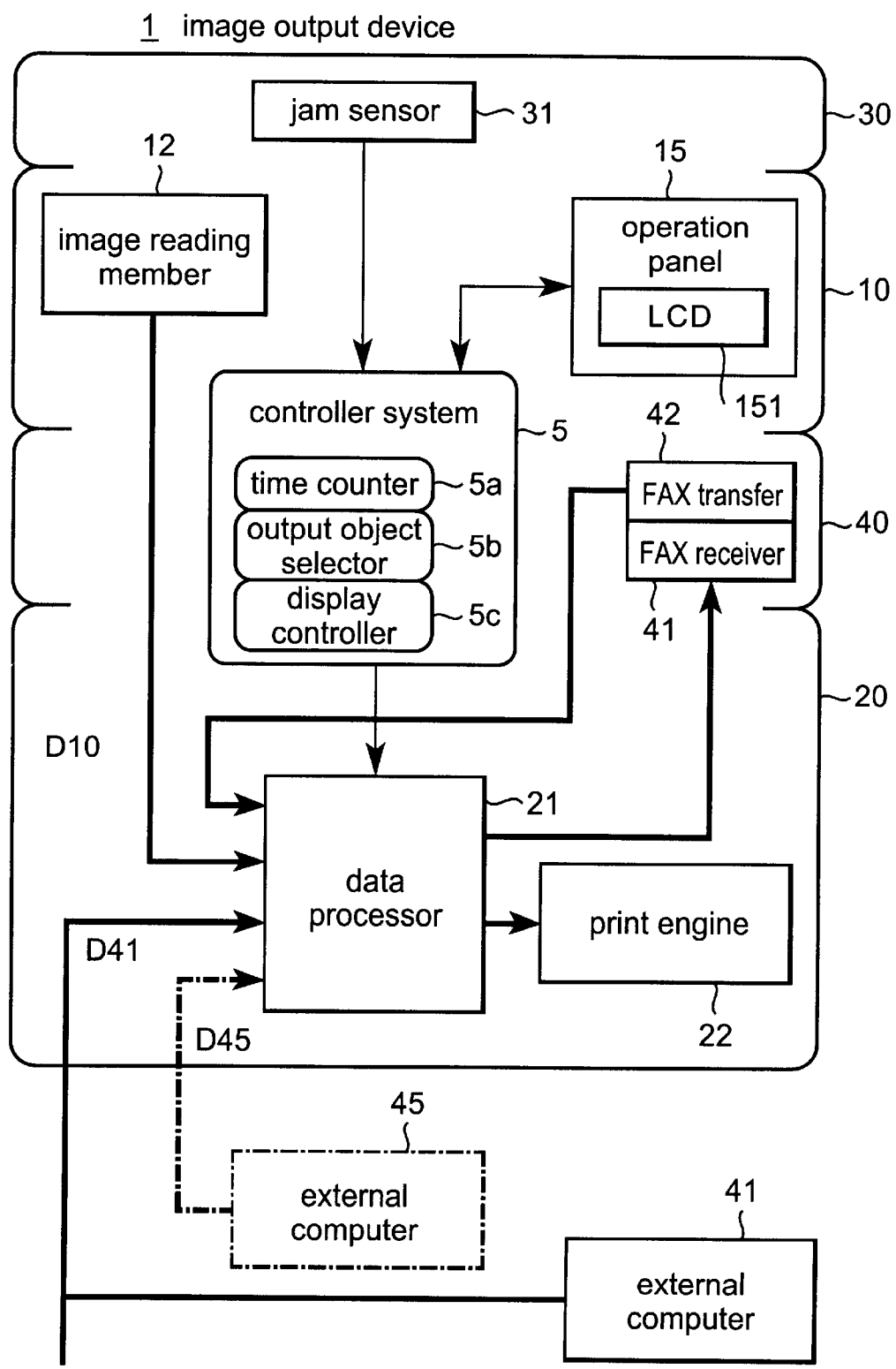
FIG. 2 is a block diagram of an image output device according to the present invention.

FIG. 2 is a block diagram pertaining to the functions of the image output device 1.

In the image output device 1, the automatic document feeder 30 has a jam sensor 31 that detects a paper jam with regard to the original document. The jam sensor 31 here is an aggregate of the detectors that are located at multiple points in the conveyance path. When a paper jam occurs, the location of the problem is displayed on the operation panel 15.

The image reading member 12 of the image reader 10 scans the image of the original document and outputs multi-value image data D10 that is obtained by quantifying the photoelectric signals obtained from the scanning. The image data D10 is input to the data processor 21 of the printer 20. To the data processor 21 are input, in addition to the image data D10, print data D41 from the external computer 41 (or print data D45 from the computer 45) and the output data from the receiver 42 of the facsimile unit 40. The data processor 21 includes the network interface 26 mentioned above and a parallel port 25. The image information input to the data processor 21 undergoes appropriate processing and is sent to the print engine 22 or the transmitter 41 of the facsimile unit 40. When this is done, command analysis and bitmap reading are performed with regard to the print data D41 or D45. Data input from external devices is accepted not only during standby but also during original document reading.

The operations of the image output device 1 can be roughly divided into (a) an operation in which the image is either (i) read from the original document by means of the image reader and printed by means of the print engine 22 or (ii) sent externally via facsimile by means of the transmitter 41 (hereinafter 'the copy operation' for the sake of convenience), and (b) an operation in which an image, the data for which is either input from the external computer 41 or 45 or externally input via a facsimile unit, is printed, or in which the image from the computer 41 or 45 is transmitted externally via facsimile (hereinafter 'the print operation' for the sake of convenience). Either operation is achieved through the connected operations of the multiple units and is controlled by the controller system 5 that comprises mainly the microcomputers in the units.

The controller system 5 has a time counter 5a, an output object selector 5b and a display controller 5c. The time counter 5a measures the time that has elapsed since the occurrence of a paper jam in the conveyance of the original document. The output object selector 5b instructs the data processor 21 whether to output the image read from the original document or an image input from an external device. The display controller 5c displays on the liquid crystal display (LCD) 151 of the operation panel 15 whether the copy operation mode or the print operation mode is present.

Figure 3:
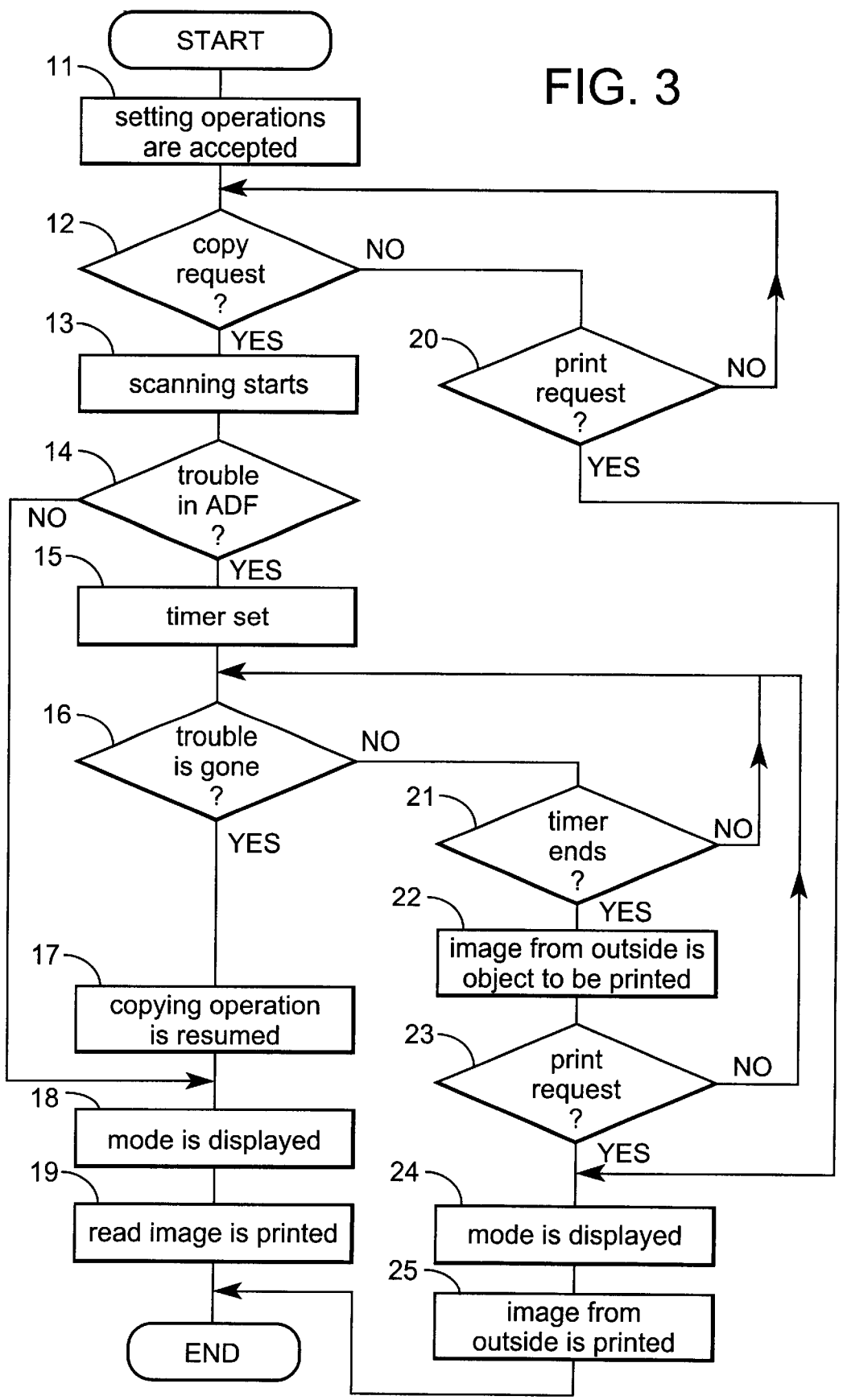
FIG. 3 is a flow chart showing the control sequence for the image output device of FIG. 2.

FIG. 3 is a flow chart of the operations of the image output device 1.

During standby, various setting operations performed by the user are accepted (#11). The setting parameters include the selection of printing or facsimile transmission and the recovery waiting period (mode maintenance period) used when a problem occurs in the automatic document feeder 30. In this embodiment, the user may designate a recovery waiting period within a range from one minute to five minutes in 30-second increments, for example.

When the copy button on the operation panel 15 is turned ON (copy request) or printing is requested from an external device, the job is executed on a FIFO basis in principle.

When printing is requested (#12, #20), the LCD 151 displays that the print operation mode is present (#24) and the printing or facsimile transmission of the image input from an external device is performed (#25).

On the other hand, if copying is requested, the original document is fed to the reading position by the automatic document feeder 30 and scanning starts (#13), and the output from the jam sensor 31 is monitored (#14). Ordinarily, the original document is fed normally and reading (image input) proceeds smoothly. In this case, the LCD 151 displays that the copy operation mode is present (#18), and printing or facsimile transmission of the image thus read is performed (#19). In contrast, where a problem that stops the feeding by the automatic document feeder 30 occurs, the counting of the recovery waiting period begins (#15), the length of which is set as described above. It is not always necessary to count the time using a dedicated time counter, however. It is acceptable if the time at which the problem occurred is input from the system's clock and stored such that it is periodically compared with the current time.

After the time counting starts, the controller waits for the set time period to elapse while monitoring whether the problem has been eliminated (#16, #21). If the problem is eliminated before the time period elapses, the copying operation is resumed and the read image is output (#17-#19). In this case, the display continues to show the copy operation mode. Where the time elapses before the problem is eliminated, the image to be output is changed from the image that was read from the original document to an image input from an external device (#22). In other words, the print engine 22 and the transmitter 41 are released to external devices. It is then determined whether a print request is present (#23). Where a print request is present, such as where data has been input from an external device during the copying operation and is stored in the buffer of the data processor 21, or where data is input from an external device after the print engine 22 and the transmitter 41 were released to external devices, the LCD 151 displays that the print operation mode is present (#24), and printing or facsimile transmission of the image input from an external device is performed (#25). If no print request is present, it is determined whether the problem has been eliminated (#16), and if it has, the copying operation is resumed (#17).

Using this embodiment, even if a paper jam occurs in the automatic document feeder 30, the copy operation mode is maintained until the recovery waiting period elapses, and therefore, the user can deal with the paper jam problem without having to rush. In addition, when the recovery waiting period has elapsed, the prohibition of printing operations is canceled, which prevents print jobs from being put on hold. Further, since it is displayed that the mode has changed from the copy operation mode to the print operation mode, the user does not become confused as to which operation mode is present. Furthermore, the setting of the recovery waiting period can be changed, which makes it possible to optimize the use of the device depending on the environment of use.

In the embodiment described above, a paper jam in the automatic document feeder 30 was assumed as a problem that would suspend image input, but a failure of the lamp that illuminates the original document or of the motor that moves the scanner may also be the problem pertaining to the present invention.

Again in the embodiment described above, the form of image output was assumed to be printing by means of the printer or facsimile transmission by means of the facsimile unit, but needless to say, the present invention may be applied to the display operation by means of a display device.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image output device, comprising:
   an image reader which cans an original document and outputs its image data;
   a receiver which receives image data from an external device;
   a device for outputting image data from the image reader and the receiver;
   a detector which detects a problem with the image reader;
   a device for suspending operation of the outputting device upon detection of the problem with the image reader;
   a counter which counts time elapsed since detection of the problem with the image reader;
   a device for enabling the outputting device to output the image data only from the external device if the problem is not yet eliminated when the counter counts up a predetermined period of time;
   a display device which displays a copy mode of operation while the image data from the image reader is output; and
   a display controller which controls the displays device to display the copy mode of operation during the predetermined period of time and to display a print mode of operation after the predetermined period of time.

2. The image output device of claim 1, wherein the outputting device includes a print engine which prints the image data as output and a transmitter which transmits the image data to another eternal device.

3. The image device of claim 1, wherein the outputting device is a multi-function digital copying machine.

4. The image output device of claim 3, wherein the external device which sends image data to the receiver is an external computer connected to the multi-function digital copying machine through a network.

5. The image output device of claim 3, wherein the image reader includes an automatic document feeder which scans documents one by one, and the detector detects a paper jam caused in the automatic document feeder.

6. The image output device of claim 1, further comprising a device for resuming operation of the image reader and the outputting device when the problem with the image reader is eliminated before the counter counts up a predetermined period of time.

7. The image output device of claim 1, wherein the display controller changes a display on the display device from the copy mode of operation to the print mode of operation when the image data from the external device is output after the predetermined period of time.

8. An image output device, comprising:
   an image reader which scans an original document and outputs its image data;
   a receiver which receives image data from an external device;
   a device for outputting image data from the image reader and the receiver;
   a detector which detects a problem with the image reader;
   a device for suspending operation of the outputting device upon detection of the problem with the image reader;
   a counter which counts time elapsed since detection of the problem with the image reader;
   a device for canceling operation of the suspending device when the counter counts up a predetermined period of time;
   a display device which displays a copy mode of operation while the image data from the image reader is output; and
   a display controller which controls the display device to display the copy mode of operation during the predetermined period of time and to display a print mode of operation after the predetermined period of time.

9. The image output device of claim 8, wherein the outputting device includes a print engine which prints the image data as output and a transmitter which transmits the image data to an eternal device.

10. The image output device of claim 8, wherein the image output device is a multi-function digital copying machine.

11. The image output device of claim 10, wherein the external device which sends image data to the receiver is an external computer connected to the multi-function digital copying machine through a network.

12. The image output device of claim 10, wherein the image reader includes an automatic document feeder which scans documents one by one, and the detector detects a paper jam caused in the automatic document feeder.

13. The image output device of claim 8, further comprising a device for resuming operation of the image reader and the outputting device when the problem with the image reader is eliminated before the counter counts up a predetermined period of time.

14. The image output device of claim 8, wherein the display controller changes a display on the display device from the copy mode of operation to the print mode of operation when the image data from the external device is output after the predetermined period of time.

* * * * *